(12) United States Patent
Ovington

(10) Patent No.: US 6,916,482 B2
(45) Date of Patent: Jul. 12, 2005

(54) TERMITE INDICATOR DEVICE

(76) Inventor: Ross Gregory Ovington, 19 The Corso, Isle of Capri, Queensland 4217 (AU)

( * ) Notice: Subject to any disclaimer, the term of this patent is extended or adjusted under 35 U.S.C. 154(b) by 0 days.

(21) Appl. No.: 10/221,863

(22) PCT Filed: Mar. 14, 2001

(86) PCT No.: PCT/AU01/00280

§ 371 (c)(1),
(2), (4) Date: Sep. 13, 2002

(87) PCT Pub. No.: WO01/69013

PCT Pub. Date: Sep. 20, 2001

(65) Prior Publication Data

US 2003/0039612 A1 Feb. 27, 2003

(30) Foreign Application Priority Data

Mar. 14, 2000 (AU) .............................................. PQ6196
Apr. 14, 2000 (AU) .............................................. PQ6918
Sep. 25, 2000 (AU) .............................................. PR0359

(51) Int. Cl.$^7$ .............................................. A01N 25/34
(52) U.S. Cl. ........................ 424/409; 43/107; 43/132.1; 424/405; 424/406; 424/84; 424/DIG. 11
(58) Field of Search ................................ 424/405, 406, 424/409, 412, 413, 84, DIG. 11; 43/132.1, 131, 127

(56) References Cited

U.S. PATENT DOCUMENTS 5,573,760 A    11/1996  Thorne et al. ................. 424/84
5,877,422 A     3/1999  Otomo ......................... 73/587
6,235,301 B1 *  5/2001  Ballard et al. ............... 424/405
6,397,516 B1 *  6/2002  Su ............................. 43/124

FOREIGN PATENT DOCUMENTS

| AU | 28490/95 | 2/1996 |
| AU | 62038/96 | 6/1997 |
| EP | 587 117 A1 | 3/1994 |
| JP | 2000-209999 | 8/2000 |
| JP | 2000-262200 | 9/2000 |

* cited by examiner

Primary Examiner—Neil S. Levy
(74) Attorney, Agent, or Firm—Fay, Sharpe, Fagan, Minnich & McKee, LLP

(57) ABSTRACT

A termite indicator device (1) for indicating the presence of termites in a house is disclosed. The device (1) comprises a termite bait element comprising a plug (3) and a timber probe (4). The probe (4) is made of a material that is eaten by termites in preference to other timbers. The device is inserted into a hole (7) in a wall (8) having a wall cavity where the probe (4) will be accessible to termites occupying the wall cavity. The probe (4) is positioned lying on the bottom plate (14) of the frame within the wall cavity which is a main path of termite movement within the frame. The plug (3) and probe (4) are connected by a cord (5) and a plastic coupler (2) which enable the probe (4) to be withdrawn in a reverse direction through the hole in the wall. They also enable the probe (4) to lie flat on the plate (14). The plug (3) may be received within a collar (6) which is permanently mounted in the wall (8), e.g. by complementary screw thread formations. The invention also extends to a method of monitoring a structure for termite infestation and also a structure incorporating the termite indicator device.

8 Claims, 7 Drawing Sheets

✦ Represents device installation positions

TERMITE INDICATOR DEVICE

FIELD OF THE INVENTION

This invention relates to a termite indicator device.

This invention relates particularly but not exclusively to a termite indicator device for use in a domestic house, eg a device which indicates the presence of termites in the timber support frame of a house or other building. It will therefore be convenient to hereinafter describe this invention with reference to this example application. However it is to be clearly understood that the invention is not limited to this example application.

BACKGROUND TO THE INVENTION

Subterranean termites otherwise known as white ants are a major problem for household owners in Australia and particularly in sub-tropical areas such as South East Queensland. These termites have a habit or predisposition for infesting structures containing timber frames such as the average home and eating away at timber in the structure including the timber frame. The problem is exacerbated by the fact the termites often enter a structure without being detected. Further once established inside a structure they often do not show any visible external signs of their presence. As a result they can cause extensive damage to a structure by eating timber, eg of a timber frame, before their presence is noticed.

Termites often enter a structure by coming up from the ground through or around cracks in a concrete slab or timber members forming the floor. They can pass through small holes in the external brickwork or sheeting or cracks in the concrete slab or timber floor. Suffice it to say that they can pass through extremely small openings and their presence within a structure is often not visible from a visual inspection of the house both internal and external. Once they have passed upwardly through these openings to a position where they are above the floor they have unlimited access to the timber frame of the structure. The frame comprises a plurality of rectangular frames comprising rectangular members that are plates and vertical members that are studs covered by an internal wall sheeting and an external wall cladding. Timber frames are generally made out of a variety of different timbers. The termites can move along the plates, in particular the lowermost plate and up and down the studs. Termites must live in darkness and as a result they are attracted to the darkness within the walls cavities inside the walls of the home.

Three ingredients are necessary to sustain termite activity. The first is shelter in a dark environment. The second is food to eat which is timber and the third is moisture. Moisture is usually provided by leaking plumbing fixtures or leaking walls in the kitchen or bathroom.

The cost of repairing structures infested with termites is high. This is because damage is done to the underlying framework which then needs to be replaced. The annual cost of termite damage to home owners in Australia is staggering. Many different types of timbers are used in timber frames in houses.

Existing management protocols typically rely on regular inspection of structures by pest control inspectors to endeavour to identify the existence of termites early on and before they have caused damage to the structure. Typically these inspectors inspect the concrete slab, roof and wall cavities and general garden area of a house to look for evidence of termite invasion. These inspections might typically be conducted once a year. Inspectors use infra red detectors, moisture detectors and pin head cameras inserted into a wall cavity to find the termites. These techniques are well known in the art and do not form part of this invention.

Regular inspections of a structure for evidence of termite presence are very important. Left unchecked termites will literally eat the entire underlying frame structure of a house.

However the cost and effort of having an annual termite inspection conducted by a pest control professional is too high for many people. Applicant has established that the majority of home owners in Queensland do not have regular termite inspections. In fact many home owners have never had a termite inspection conducted. In addition this practice of having annual inspections has its limitations. Termites can effect a lot of damage in the time between annual inspections.

It is not practical to treat a house for termite infestation until termite infestation and the location of the termites has been identified. Once the termites have been found they can be treated using existing treatment techniques. Again these techniques would be well known in the art and do not form part of this invention.

Clearly therefore identifying the early presence of termites in a structure remains a challenge in termite control. Clearly it would be desirable if a system could be devised to enable home owners to regularly inspect their homes themselves for the presence of termites in between regular pest control inspections. It would also be desirable if such a system allowed for very frequent checks, eg every month or every fortnight in high risk areas.

SUMMARY OF THE INVENTION

According to one aspect of this invention there is provided a termite indicator device for indicating the presence of termites in a structure, including:

a termite bait element which includes material which is typically eaten by termites, the bait element being removably insertable into a wall having a wall frame so that the material is accessible to termites located in the wall frame.

Often there is a wall cavity associated with the wall frame, eg adjacent the frame.

Thus the essence of the invention resides in inserting a termite bait element into a wall frame where it will attract the attention of any termites present in the wall frame. The termites will consume or attack the bait element thereby indicating the presence of termites when the termite bait element is withdrawn from the wall frame and inspected. The element is positioned in the space between the various members making up the frame.

It is envisaged that this element will be inspected at regular intervals for evidence of termite activity, hence the need for the bait element to be removable.

The material is preferably a material that is eaten by termites in preference to other materials, eg. Mountain ash, radiata pine or hoop pine, cork or cellulose. However it is to be clearly understood that the invention is not confined to these materials.

Applicant understands that these materials are the most preferred food of termites and will consume these materials before other timbers, eg, the types of timber from which house frames are made.

In this specification the term "bait" is to be interpreted broadly. For example it will include any material which is consumed by termites.

Typically the wall includes an internal wall sheeting and said wall frame, and optionally also a wall cavity adjacent to and outward of the wall frame. The termite bait element typically comprises a plug which is snugly received within a hole in the wall sheeting and a timber probe comprising said material preferentially eaten by termites which is located in said wall frame in a position where it is accessible to termites.

The device may include a collar which is permanently mounted in the wall defining the hole in the wall panel, and the plug may be received in the collar when the device is mounted in position in the wall panel. Typically the plug is sized to be snugly received within the collar with a small amount of clearance.

The wall frame may comprise a plurality of studs and plates, and the probe may be positioned resting on a bottom plate of said frame.

The applicant has ascertained that termites typically travel along the bottom plate of a house frame. The probes are thus placed in the path of termites moving about inside the timber structure.

The probe may be indirectly coupled to the plug, and the termite bait element may include a flexible element intermediate the probe and the plug for permitting the probe to rest at a different height to the plug in the wall, eg a short rubber or plastic cord.

The termite bait element may also include centering means for positioning the probe broadly centrally with respect to the hole in the wall when it is pulled in a reverse direction. This enables the probe to be pulled rearwardly through the hole in the wall.

In one particularly preferred form the centering means comprises a coupler having one end pivotally attached to the timber probe and an opposed end attached to the flexible element.

The coupler may have a rounded opposed end or leading end to guide it into the hole in the wall to withdraw it from the hole. In one form the coupler resembles a bullet with a blunt nose.

Thus the flexible element and coupler enables the probe to drop down on to the bottom plate once inside the wall cavity and lie flat on the plate and the coupler permits it to be withdrawn backwards through the collar, eg to facilitate inspection of the timber probe. The rounded end of the coupler assists in this process.

Alternatively the centering means comprises a wire clip having a broadly triangular configuration with bottom corners of the triangle being attached to diametrically opposed points on the end of the probe.

Thus a particularly useful feature is the fact that the plug and associated collar can be positioned above the skirting board while at the same permitting the timber probe to drop down on to the bottom plate which is spaced below the collar once inside the wall cavity to be in a position where it lies in the path of termite travel around the frame structure and where it can attract the attention of termites.

Further alternatively the timber probe may be directly coupled to the plug and project into the wall cavity in alignment with the plug, eg the probe may be a substantially linear extension of the plug.

Advantageously the collar defines an internal screw thread formation and the plug defines a complementary external screw thread formation so that said one and complementary screw thread formations can engage when the device is mounted in a wall panel. This firmly mounts the plug and thereby the device to the wall. The plug can be inserted into and removed from the wall by relative rotation between the plug and collar. Naturally in this form the collar and plug will have substantially circular cylindrical configurations.

The probe is passed through the collar to insert it into the wall cavity. However unlike the plug which is retainingly engaged by the collar it slides freely through the collar. Preferably the probe has a circular cylindrical cross-section although this is not essential.

Typically the collar and plug may be made of plastic, eg by injection moulding, although clearly other materials may be contemplated.

The plug typically has a head which includes means for rotating the plug, eg, a straight line or hex recess for receiving the end of a screwdriver.

Applicant is aware of research that shows that termites will consume all of a most preferred material, eg maranti, mountain ash, oregon or pine, in a certain area before moving on to a second less preferred type of wood in the same area and then moving on to a third even less preferred wood in the area. Thus by choosing a material which is favoured by the termites, they can be induced to preferentially attack the material of the probe before consuming the structural timber in the frame of the structure. This will enable the presence of termites to be detected and noted at an early opportunity.

Optionally the probe may further include an active agent that is toxic to termites, eg in the form of a chemical compound coated on the probe. This would enable the device to eradicate termites in addition to indicating their presence.

According to another aspect of the invention there is provided a method of monitoring a structure having walls and a timber frame for signs of termite infestation, the method including:

placing a termite indicator device including at least one termite bait element which includes material which is typically eaten by termites inside the structure in proximity to the timber frame; and periodically inspecting the/each termite bait element for evidence of termite infestation.

The method may include using a bait element that is made of a material that is preferred by termites to other materials namely mountain ash, cork and cellulose.

The method may include placing a plurality of bait elements at spaced intervals around the walls of the structure.

The method may also include inserting the bait elements through the wall to access the timber frame within the wall.

Typically the method is applied to a timber frame comprising studs and plates and the bait elements are positioned resting on the bottom plates of the frame.

Preferably the bait elements are positioned less than 5 metres apart along the wall of the structure.

Preferably the method includes inspecting the bait elements at least every 6 months, more preferably every 2 months, and most preferably every month. In high risk areas the bait elements may be inspected about every fortnight.

In a most preferred form each bait element comprises a plug and a timber probe connected by a flexible element removably inserted into a hole in the wall with the probe resting on the bottom plate of the timber frame and the probe is inspected by withdrawing it in a reverse direction from the hole and visually inspecting it for signs of termite infestation.

The termite indicator devices may include any one or more of the other features of the termite indicator devices described above with respect to the first aspect of the invention.

According to another aspect of this invention there is provided a structure comprising:

a timber frame and at least one wall with a wall cavity, and at least one termite indicator device comprising a termite bait element which includes material which is typically eaten by termites, the bait element being removably mounted in the wall and projecting into the wall cavity so that the material is accessible to termites in the wall cavity.

The structure will typically have a plurality of said termite indicator devices.

The termite indicator devices will typically be positioned resting on the bottom plates of the timber frame of the structure. The indicator devices may be located at spaced intervals along the walls of the structure. Preferably the devices are located less than 5 meters apart, and more preferably every 2–3 metres along the walls.

Preferably the devices are positioned proximate to corners formed by intersecting walls.

Naturally the termite indicator devices may include any one or more of the preferred features of the device described above with respect to the first aspect of the invention.

Applicant envisages that users would rather not make a hole in the skirting board. They would rather make a hole in the plasterboard above the skirting and then let the timber probe hang down from the hole and rest on the bottom plate of the frame.

According to another aspect of this invention there is provided a termite surveillance system for use, eg in a residential property, the system including:
a plurality of termite indicator devices as described above with reference to the first aspect of the invention, mounted at spaced intervals around the perimeter of a standard house.

The termite indicator devices may include any one or more of the optional features of the devices described above with respect to the first aspect of the invention.

Typically each device includes a collar permanently received in and mounted to the wall. During the installation process the collars are fitted at spaced intervals around the perimeter wall of the house. Thereafter the plugs can be screwed into the collars.

Preferably the wall mounted termite indicator devices are mounted on the internal wall panels or internal wall sheeting of a house, ie in the plasterboard. However it is to be clearly understood that this is not essential and the devices can be placed anywhere in the structure. For example the devices may also be located in the ceiling.

Typically the wall mounted termite indicator devices are positioned in the lower regions of a wall, eg closely spaced above a skirting board.

The spacing between adjacent termite indicator devices may be in the region of 2 to 4 metres, preferably about 2 to 3 metres, although these distances may be varied.

Alternatively the wall mounted termite indicator devices may be mounted on the external wall cladding of a house. The invention can be equally efficacious when the devices are mounted on the external wall cladding. However it is envisaged that it will be more complex and labour intensive to mount the collars on external wall cladding where it is made of masonry and therefore the internal wall sheeting is preferred for such walls.

According to yet another aspect of this invention there is provided a kit for a termite surveillance system described above with reference to the third aspect of the invention to a wall of a house, the kit including:
at least one termite indicator device as described above with reference to the first aspect of the invention.

Typically each device includes a bait element including a plug and a probe and a complementary wall mounting component, eg a collar.

Typically the kit includes at least 30 said termite indicator devices, eg about 40 to 50 devices. However it will be clearly understood that the number of devices used will depend on house size and design.

DETAILED DESCRIPTION OF THE INVENTION

A termite indicator device in accordance with the invention may manifest itself in a variety of forms. It will be convenient to hereinafter describe in detail two preferred embodiments of the invention with reference to the accompanying drawings in some detail. The purpose of providing this written description is to instruct persons having an interest in the subject matter of the invention how to carry the invention into practical effect. It is to be clearly understood however that the specific nature of this description does not supersede the generality of the preceding broad description. In the drawings:

Figure 1:
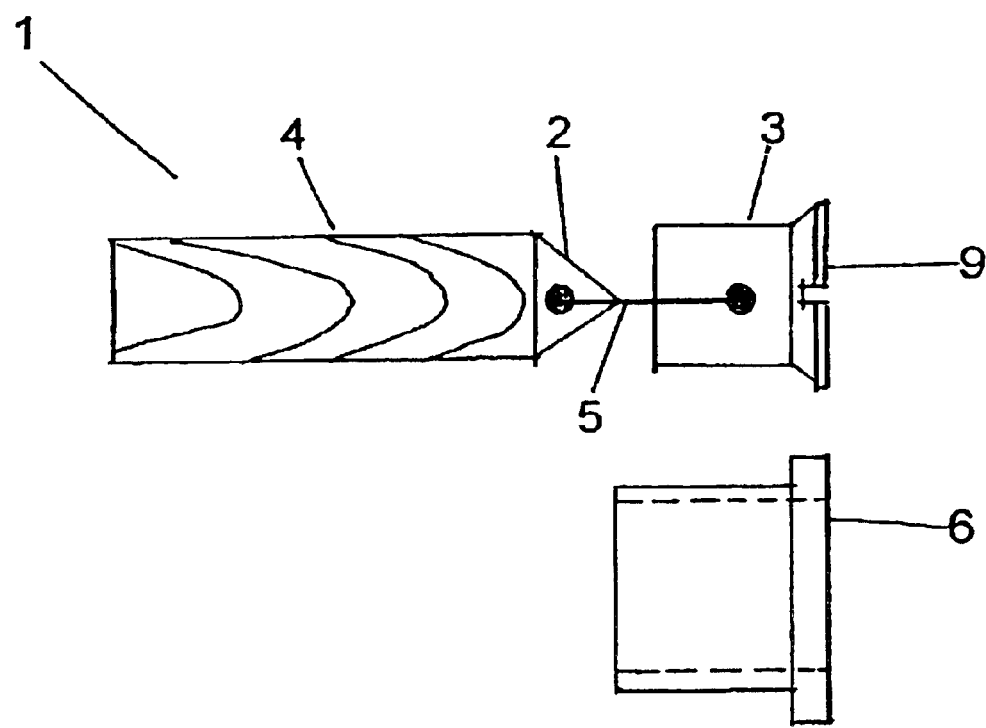
FIG. 1 is a side view of a termite indicator device in accordance with a first embodiment of the invention.

In FIG. 1 reference numeral 1 refers generally to a termite indicating device in accordance with the invention.

The device 1 comprises broadly a termite bait element comprising a plug 3 and a probe 4 of mountain ash. Mountain ash is one of the favoured foods of termites and tends to be eaten by termites first in preference to other woods, eg of the frame structure. The probe 4 is connected to the plug 3 by means of a short plastic or rubber cord 5 and coupler 2 that is pivotally mounted to an end of the probe 4. The device 1 also includes a collar 6 that is received in a hole 7 in a wall 8 and permanently mounted thereto.

The plug 3 is passed through the collar 6 to insert it into the wall 8. The plug 3 has an external screw thread formation which is complementary to an internal screw thread formation defined on the collar 6. The plug 3 also has a screwdriver engaging formation on its face 9, eg a linear slot or a hex, to enable the plug 3 to be screwed into and out of the collar 6 for respectively insertion and removal of the plug 3 and timber probe 4.

Figure 2:
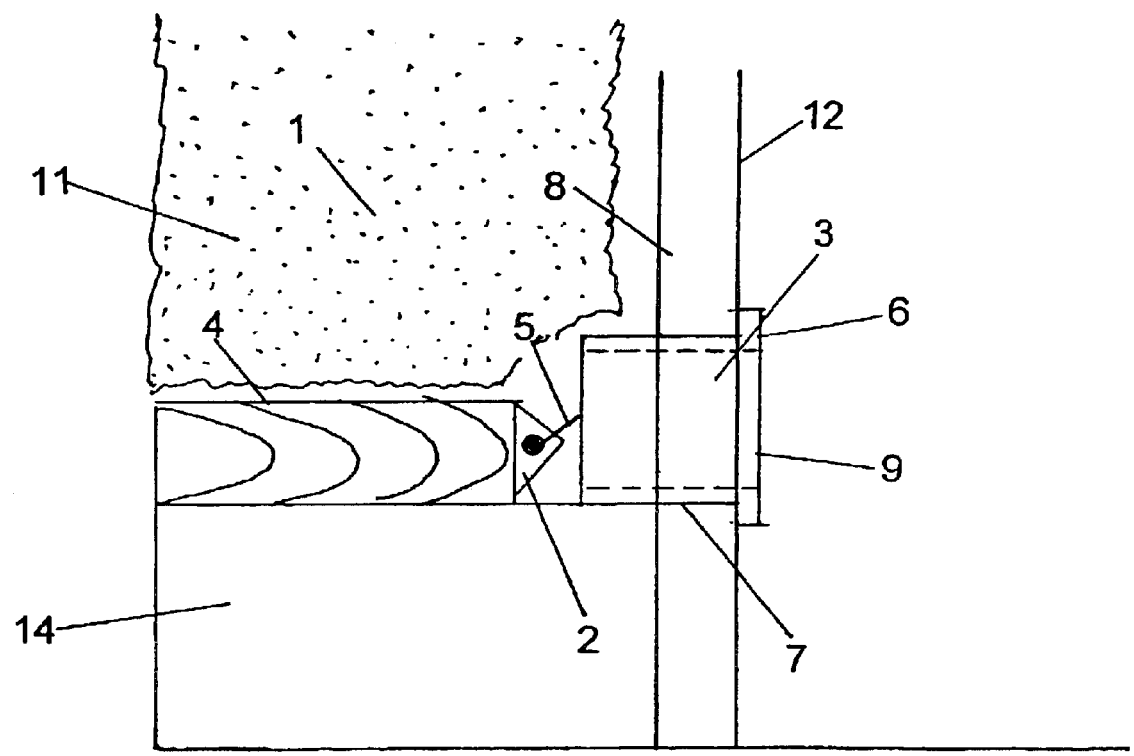
FIG. 2 is a sectional side view of the device of FIG. 1 in use mounted on a wall.
Figure 3:
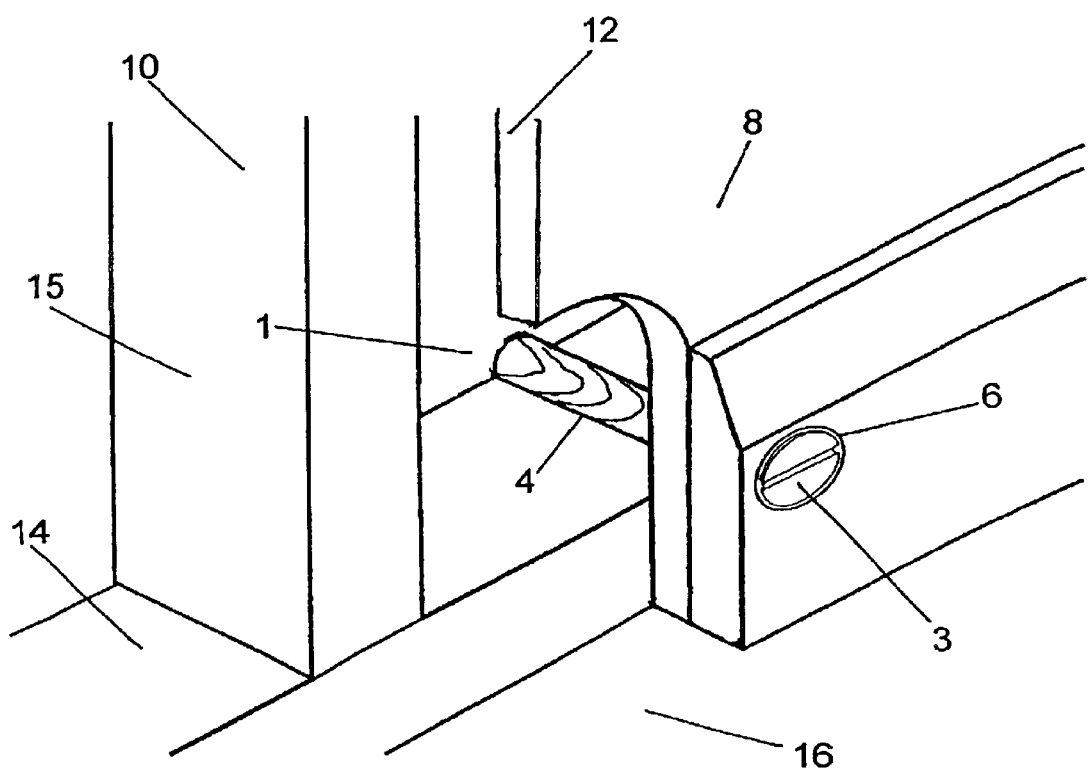
FIG. 3 is a 3-dimensional view of the device of FIG. 1 in use mounted on a wall.

As shown in FIGS. 2 and 3, the wall 8 comprises an underlying timber frame 10, a plasterboard wall panel or sheet 12 forming the internal lining or wall sheeting and a brick or timber or composite veneer (not shown) either mounted directly on the frame or spaced a small distance outwardly away from the frame 10. The plasterboard panel or sheet 12 is fastened to the timber frame 10. The timber frame 10 in turn is made of a plurality of horizontally extending plates 14 and vertically extending studs 15. The stud and plate structure are typically mounted on a concrete slab 16 although in some instances they may be mounted on a timber floor mounted on stumps spaced above the ground.

The probe 4 projects into the spaces occupied by the frame 10 behind the wall lining 12 and rests on the bottom plate 14 of the frame 12. The short cord 5 and coupler 2 enables the probe 4 to drop down onto the bottom plate as illustrated.

The termite indicating device is shown mounted low in the wall passing through a skirting board. This low position is most beneficial when the device 1 needs to be positioned beneath batt type wall insulation 11, ie the probe 4 needs to project through the wall 8 below the bottom edge of the insulation 11. This low position and the fact that the probe 4 is attached to the flexible cord 5 and coupler 2 allows the timber probe 4 to drop onto the bottom plate 14. This is the preferred position for the probe as it lies in a major path of termite movement around the frame 10.

In use the plug 3 and probe 4 are periodically removed from their mounting in the wall 8 and the probe 4 inspected for evidence of termites. The coupler 2 with its rounded end enables the probe 4 to be withdrawn in a reverse direction through the collar to inspect the probe 4.

It is envisaged that the probe 4 will be inspected every few months. If the probe 4 shows evidence of termite presence the appropriate remedial action should be taken immediately. This treatment may take a number of forms that are well known in the art.

Provided that the probe 4 has been regularly inspected termites would not have been in the frame 10 before they were discovered and little or no damage should have been done to the underlying timber structure.

The Applicant also envisages that the holes in the wall 7 formed by the collars 6 will be used by termite inspectors to gain access to the interior of the wall, ie the timber frame, without drilling through the wall when they are called in once termite infestation is suspected. This will be a very useful secondary benefit of the device 1.

Figure 4:
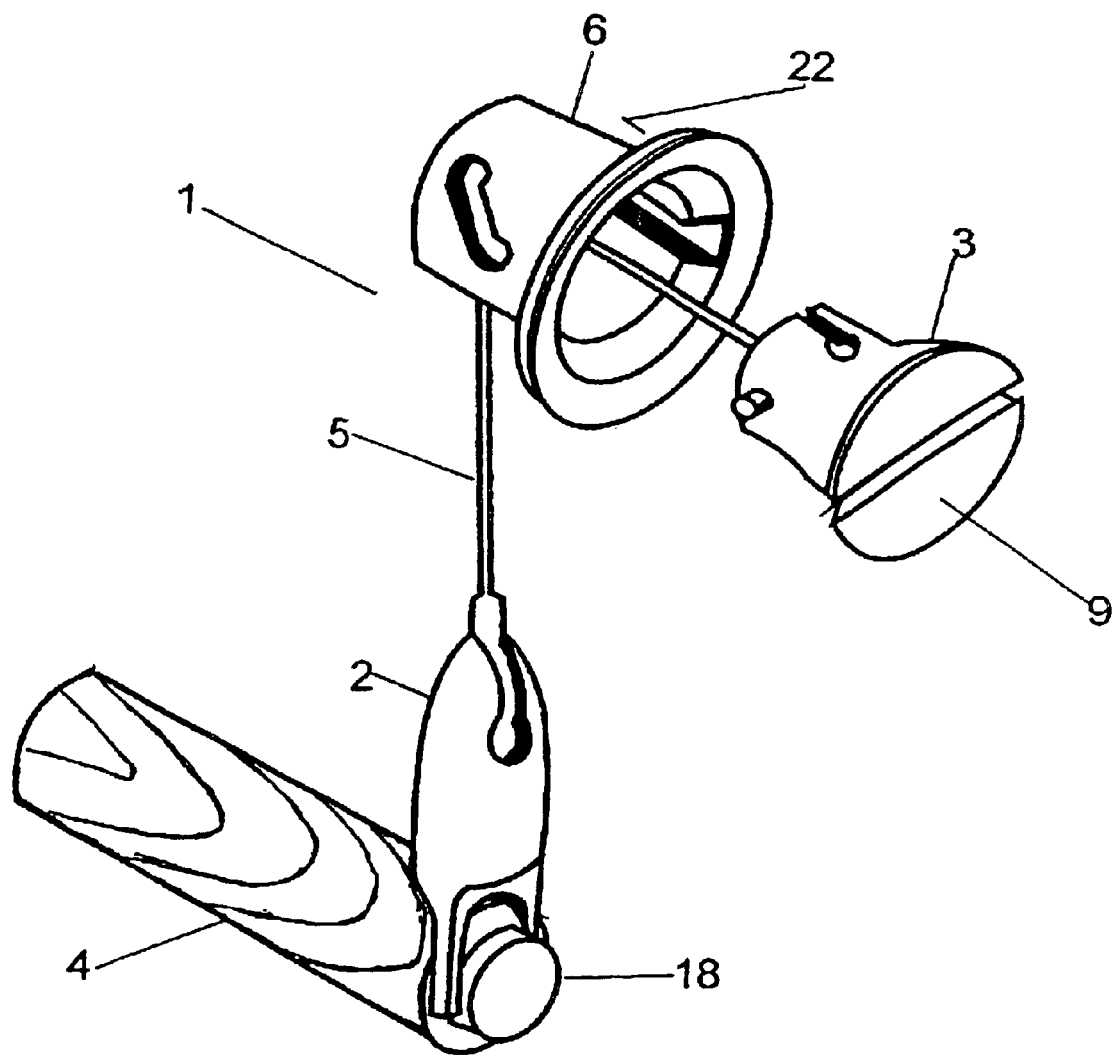
FIG. 4 is a 3-dimensional view of a device in accordance with a second embodiment of the invention.
Figure 5:
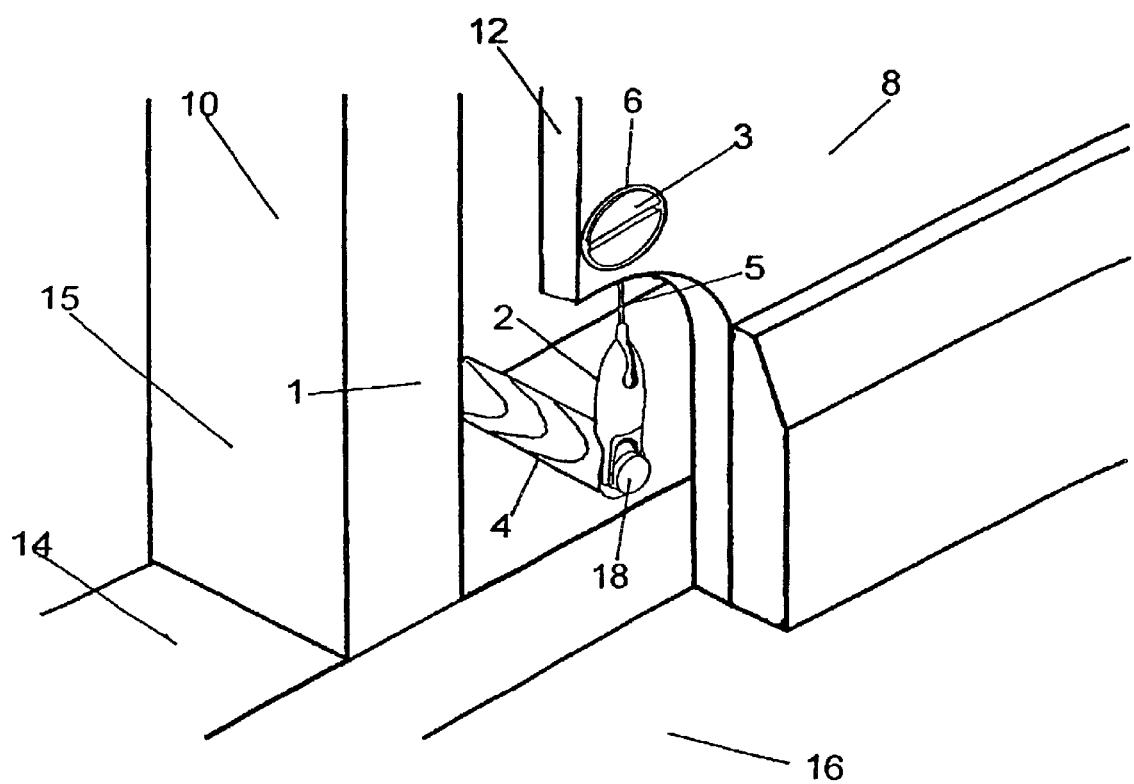
FIG. 5 is a 3-dimensional cutaway view of the device of FIG. 4 in use mounted on a wall.
Figure 6:
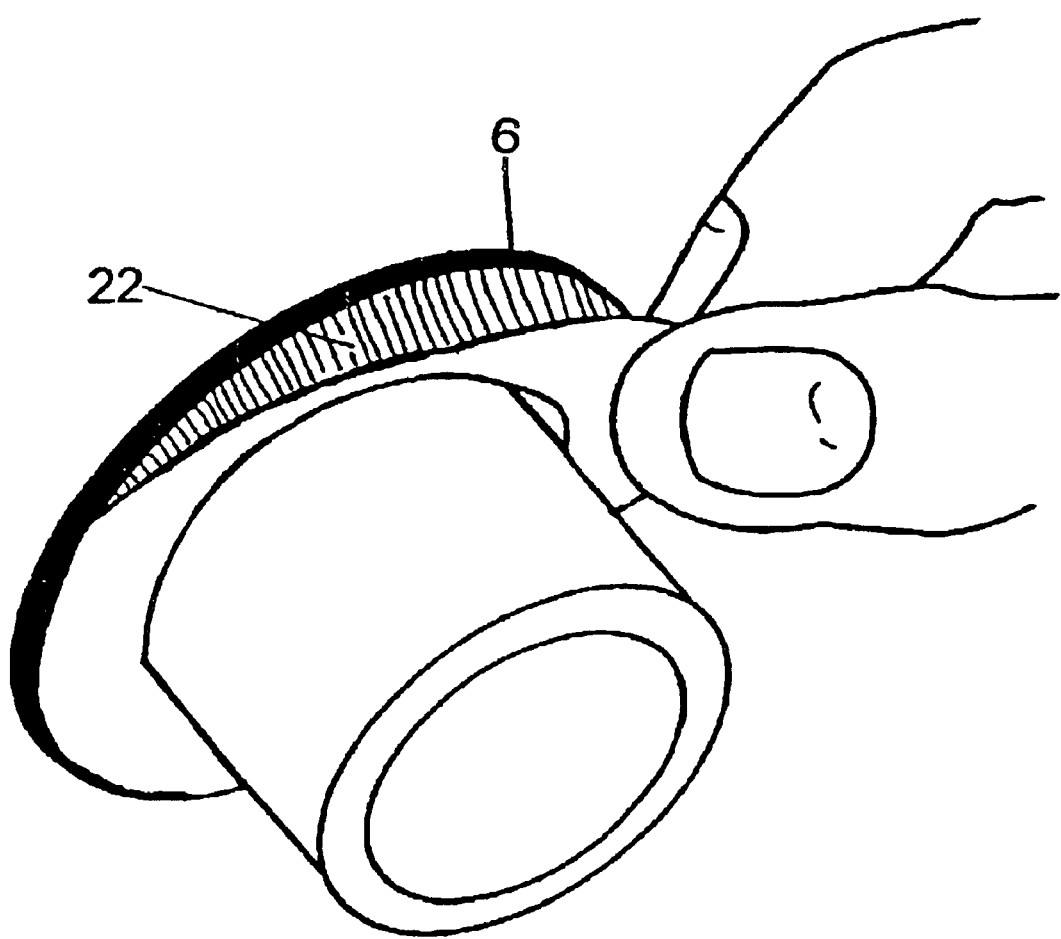
FIG. 6 is a 3-dimensional view of the reverse side of a collar of the device of FIG. 4 prior to insertion in a wall.

FIGS. 4 to 6 illustrate a device in accordance with a second embodiment of the invention. As the device has some similarities with the FIG. 1 embodiment the same reference numerals will be used to refer to the same components unless otherwise indicated.

The device 1 comprises broadly a bait element comprising a plug 3 and a timber probe 4 which are interconnected by a flexible plastic or rubber cord 5 and a plastic coupler 2. The coupler 2 is pivotally mounted to an anchor element, eg a plastic button 18 which is fixed, eg glued or stapled to the timber probe 4. The coupler 2 is a plastic bullet shaped component having a blunt nose for centralising the probe 4 relative to the collar to permit it to be withdrawn in a reverse direction through the collar 6. It is also important that the coupler 2 has the ability to pivot relative to the probe 4. This enables it to rest along its full length on the plate.

In use when the plug 3 is inserted into the collar 6, the probe 4 is pushed through the collar 6 and then drops down onto the bottom plate 14. There it lies in a major path of termite movement within the wall 8. The face 9 of the plug 3 forms a neat external finish on the wall sheeting 12.

From time to time the plug 3 and probe 4 are withdrawn and inspected for evidence of termite infestation. The probe 4 is withdrawn by unscrewing the plug 3 and then withdrawing it from the collar 6. This hoists the probe 4 upwardly towards the collar 6 and then out through the hole 7 in the wall 8. The plastic coupler 2 assists in centering the probe 4 relative to the collar and guiding the probe in a reverse direction through the opening.

Termite presence is indicated either by the presence of termite specimens, part or all of the probe being eaten away, grey mudding material present on the probe and pepper like stains on the probe. If the probe indicates possible presence of termites a pest control inspector should be called in immediately.

For installation, a hole 7 is drilled in the wall sheeting 12 of the wall 8 and the collar 6 is fitted in the hole 7. In the illustration the hole 7 is positioned just above the skirting board although this need not always be the case. Thereafter the bait element comprising plug 3 and probe 4 is inserted into the hole with the plug 3 engaged with the collar 6. The face 9 of the plug 3 is broadly flush with the wall sheeting 12 and forms a neat aesthetic finish. The probe 4 drops down on to the bottom plate 14 of the timber frame 10 of the house when displaced inwardly of supporting engagement with the collar 6. It then lies on the plate in the path of termite movement within the frame structure and wall generally.

FIG. 6 illustrates the rear of the collar 6 before it is mounted on a wall. The collar 6 has a flange 22 to enhance mounting of the collar on the wall sheeting 12. A contact adhesive is coated on the rear surface of the flange 22 to stick the collar 6 to the wall sheeting 12 when it is mounted on the wall 8. FIG. 6 shows backing paper covering the adhesive on the rear surface of the flange 22.

Figure 7:
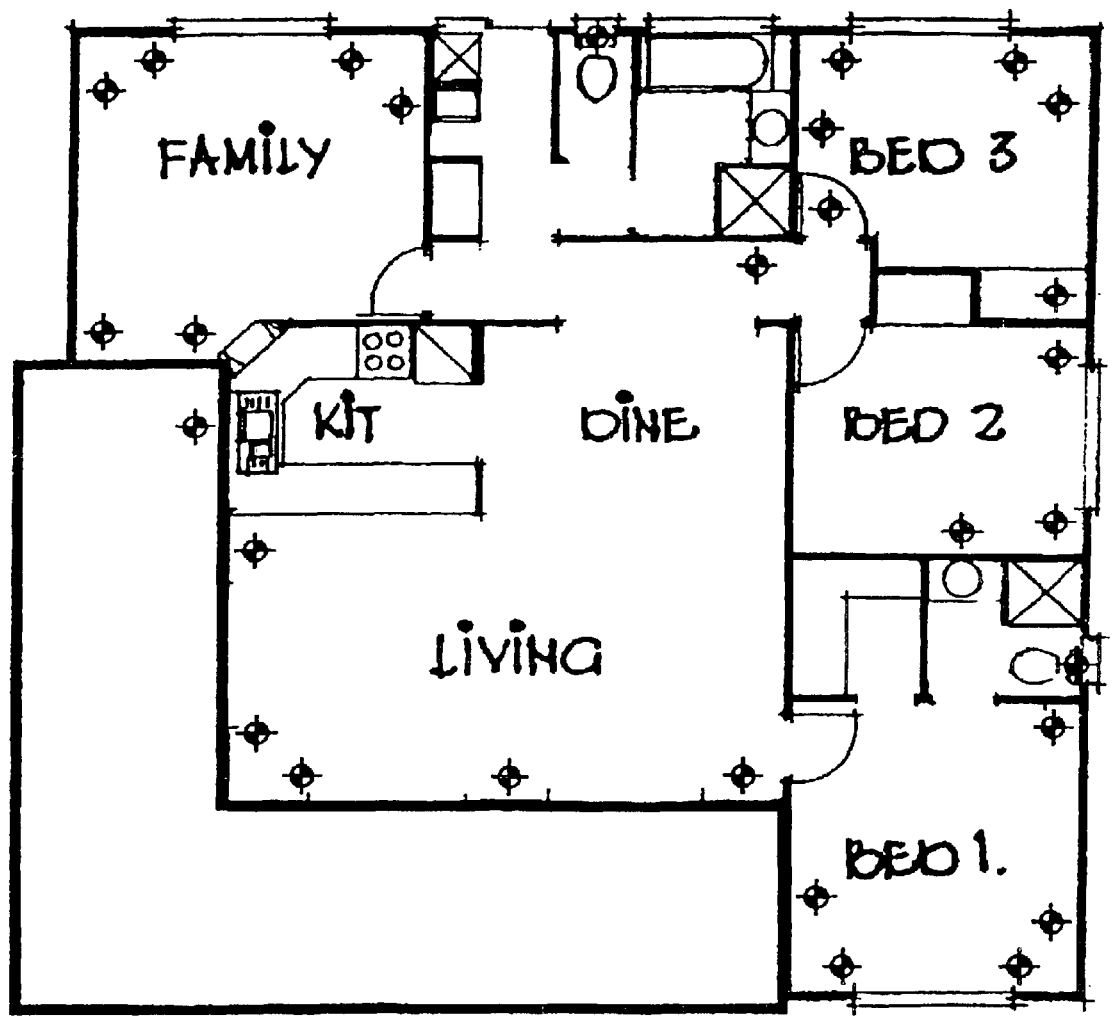
FIG. 7 is an example plan view of an example house showing suggested positions for wall mounted termite indicator devices according to the embodiments of FIG. 1 and FIG. 4.

FIG. 7 illustrates suggested device installation points on the plan of a building which is a house. In this illustration all the devices 1 are positioned just above the floor and none are located in the ceiling. Generally the devices are located near the intersection of walls. This is a preferred gathering point of termites. The probes are also positioned in suspected nesting areas and areas where dampness occurs.

Another option which the applicant has contemplated is that of positioning the termite indicating devices on electrical plug points or power points particularly the covers thereof which are mounted on internal walls slightly above the skirting board. It is envisaged that this will provide a convenient location for these termite indicating devices and it will be presented in an aesthetically pleasing fashion.

An advantage of the termite indicator device and system described above with reference to the drawings is that it is a fairly simple and affordable contrivance which can be relatively easily manufactured and which has considerable utility in detecting termites. The cost of inserting the collars initially to receive the plug and dowels would not be high. It is envisaged that the cost of installing these devices in the manner indicated on a house would be very small when compared with the potential damage that can be done by termites.

In addition the technology is empowering because it enables a house owner to take control of monitoring their property for signs of termite infestation. For the first time they do not need to rely on trained pest control inspectors. Further the owners can carry out the inspections at no cost and at times that suit them.

It will of course be realised that the above has been given only by way of an illustrative example of the invention and all modifications and variations thereto as would be apparent to persons skilled in the art are deemed to fall within the broad scope and ambit of the invention as herein set forth.

What is claimed is:

1. A wall assembly for indicating the presence of termites within the wall assembly, comprising:
   a wall frame including a plurality of studs and plates, each stud and plate having first and second sides;
   an internal wall sheeting that is mounted on the first sides of the studs and plates, the internal wall sheeting having a hole therein;
   a collar inserted into the bole of the internal wall sheeting, the collar defining a plug hole;
   a termite bait assembly including:
      a plug sized to be snugly received within the plug hole;
      a timber probe including a material that is preferentially consumed by termites, the probe being sized to pass through the plug hole;
      a flexible element intermediate the probe and the plug for permitting the probe to rest on at least one of the plurality of plates spaced from the plug, the flexible element being sized to pass through the collar; and
      a coupler having one end pivotally attached to the probe and an opposed end attached to the flexible element, the pivotal attachment permitting the probe to extend generally horizontally relative to the plate and permitting the flexible element to extend generally vertically relative to the plug, the opposed end of the coupler having a generally round contour for helping to align the coupler with respect to the plug hole as the coupler is pulled back through the plug hole;
   whereby when the termite bait assembly is inserted into the plug hole, the probe is pushed all the way through the plug hole and out an inner end thereof and drops onto at least one plate below the hole where the probe lies flat on the plate and the plug is received within the plug hole, and when the probe needs to be withdrawn from within the wall frame for inspection, the plug is pulled out of the plug hole and this in turn pulls the probe and the coupler in a reverse direction up from the plate, back through the plug hole and then out of the wall assembly, the rounded end of the coupler acting to align the coupler relative to the plug hole and guide the coupler and probe through the plug hole, and then once the inspection has been completed the probe is pushed back into the plug hole followed by the plug and this pushes the probe back through the inner end of the plug hole from where the probe drops back onto the plate.

2. A termite indicating device, comprising:

a collar configured for insertion into a hole of internal wall sheeting, the collar defining a plug hole; and a termite bait assembly including:

a plug that is releasably engaged within the plug hole;

a probe including a material that is consumed by termites, the probe being sized to pass through the plug hole;

a flexible element intermediate the probe and the plug for permitting the probe to rest spaced from the plug on a plate internal to a wall, the flexible element being sized to pass through the plug hole of the collar; and a coupler having one end pivotally attached to the probe and an opposed end attached to the flexible element, such that the probe extends generally horizontally relative to the plate and the flexible element extends downwardly from the plug, the opposed end of the coupler having a generally round contour for aligning the coupler with respect to the plug hole as the coupler is pulled back out of the plug hole for inspection.

3. The wall assembly according to claim 1, wherein the probe is made of one or more of mountain ash, cork and cellulose.

4. The wall assembly according to claim 1, wherein the probe is positioned resting on a bottom plate of said wall frame.

5. The wall assembly according to claim 1, wherein the flexible element is a rubber or plastic cord.

6. The termite indicating device according to claim 2, wherein the collar defines an internal screw thread formation and the plug defines a complementary screw thread formation, whereby said one and complementary screw thread formations engage when the device is mounted in the internal wall sheeting.

7. The wall assembly according to claim 1, wherein the plug has an end face that defines a formation for receiving the end of a rotating device thereby to facilitate insertion and removal of the plug.

8. The wall assembly according to claim 1, wherein the probe further includes an active ingredient that is toxic to termites coated on the surface of the probe.

* * * * *